April 25, 1950 P. E. FUNDERBURG 2,504,972

PICTURE AND SOUND TRANSMITTER

Filed April 29, 1946 2 Sheets-Sheet 1

INVENTOR
PAUL E. FUNDERBURG

BY [signature]

ATTORNEY

INVENTOR
PAUL E. FUNDERBURG

BY [signature]

ATTORNEY

Patented Apr. 25, 1950 2,504,972

UNITED STATES PATENT OFFICE 2,504,972

PICTURE AND SOUND TRANSMITTER

Paul E. Funderburg, Fort Wayne, Ind., assignor, by mesne assignments, to Farnsworth Research Corporation, a corporation of Indiana Application April 29, 1946, Serial No. 665,921

6 Claims. (Cl. 178—5.8)

Figure 1:
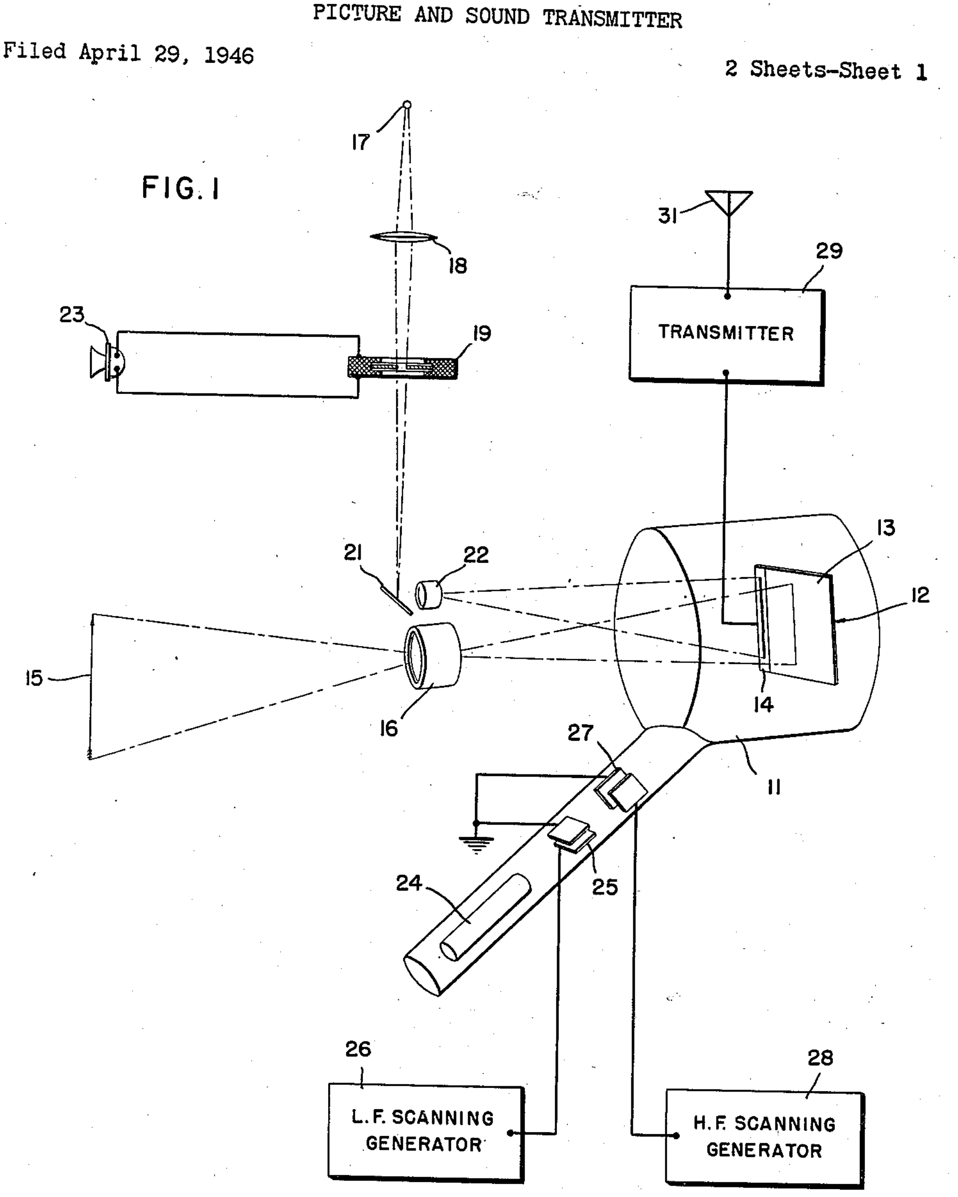

This invention relates to signaling systems and more particularly to television systems wherein both video and audio intelligence is transmitted.

It is customary in television systems to visually reproduce a television subject and concurrently to aurally reproduce the accompanying sound. Generally, the video intelligence is transmitted on one communication channel and the audio intelligence on another. Not only does such a system require the use of two communication channels, but it also necessitates the use of both transmitting and receiving equipment individual to the video and audio signaling channels. The number of communication channels available necessarily is limited; hence it is desirable wherever possible to make the most efficient use of the available channels. Furthermore, the necessity of providing separate transmitting and receiving apparatus for the video and audio intelligence is costly. It, therefore, also is desirable to minimize the apparatus required for transmitting and receiving the video and audio signals.

The apparatus necessary for generating video signals must include a light sensitive device. This is necessary by reason of the fact that the television subject which is to be represented by the video signals consists of light components. The accompanying sound which is to be represented by the audio signals, on the other hand, ordinarily is translated by apparatus including electroacoustical devices directly into electrical signal effects. However, there have been devised sound recording and reproducing systems which function by translating the sounds into modulated light components. The present invention contemplates the use of such sound recording and reproducing systems thereby to provide a television system which will enable a more advantageous employment of the available facilities.

It, therefore, is an object of the present invention to provide a television system wherein both the video and audio signals are generated by means of light sensitive apparatus.

Another object of the invention is to provide, in a televison system, a signal generating tube having a photosensitive electrode, a portion of which is exposed to light representing the television subject and another portion of which is exposed to light representing the accompanying sound.

Still another object of the invention is to provide in a television system a receiving tube having a light producing fluorescent screen for the reproduction of the television subject and an adjacent electrode for use in the reproduction of the accompanying sound.

In accordance with this invention, there is provided at the transmitter a signal generating tube which may be of the charge-storage type including a photosensitive mosaic electrode. The major portion of this electrode is exposed to a light image of the television subject. The remaining smaller portion of the electrode is exposed to modulated light representative of the accompanying sound. The entire electrode is scanned in the usual manner by an electron beam. At the beginning or end of each horizontal line scanned by the beam, there is generated a signal representative of the sound. During the remainder of each line scansion, the representative video signals are generated. Both the video and the audio signals are used to modulate a single transmitter. At the receiver there is provided a cathode ray tube having the usual fluorescent screen. Along one edge of this screen there is provided an auxiliary electrode which may be in the form of a metallic strip which may be coupled to a filter and/or an amplifier. The amplifier in turn is coupled to a sound reproducing device. Both the fluorescent screen and the auxiliary electrode are scanned by an electron beam which is modulated by the received combined video and audio signals. The audio signals modulate the beam while it is traversing the auxiliary electrode and the video signals modulate the beam while it is traversing the fluorescent screen.

For a better understanding of the invention, together with other and further objects thereof, reference is made to the following description, taken in connection with the accompanying drawings, and its scope will be pointed out in the appended claims.

Figure 2:
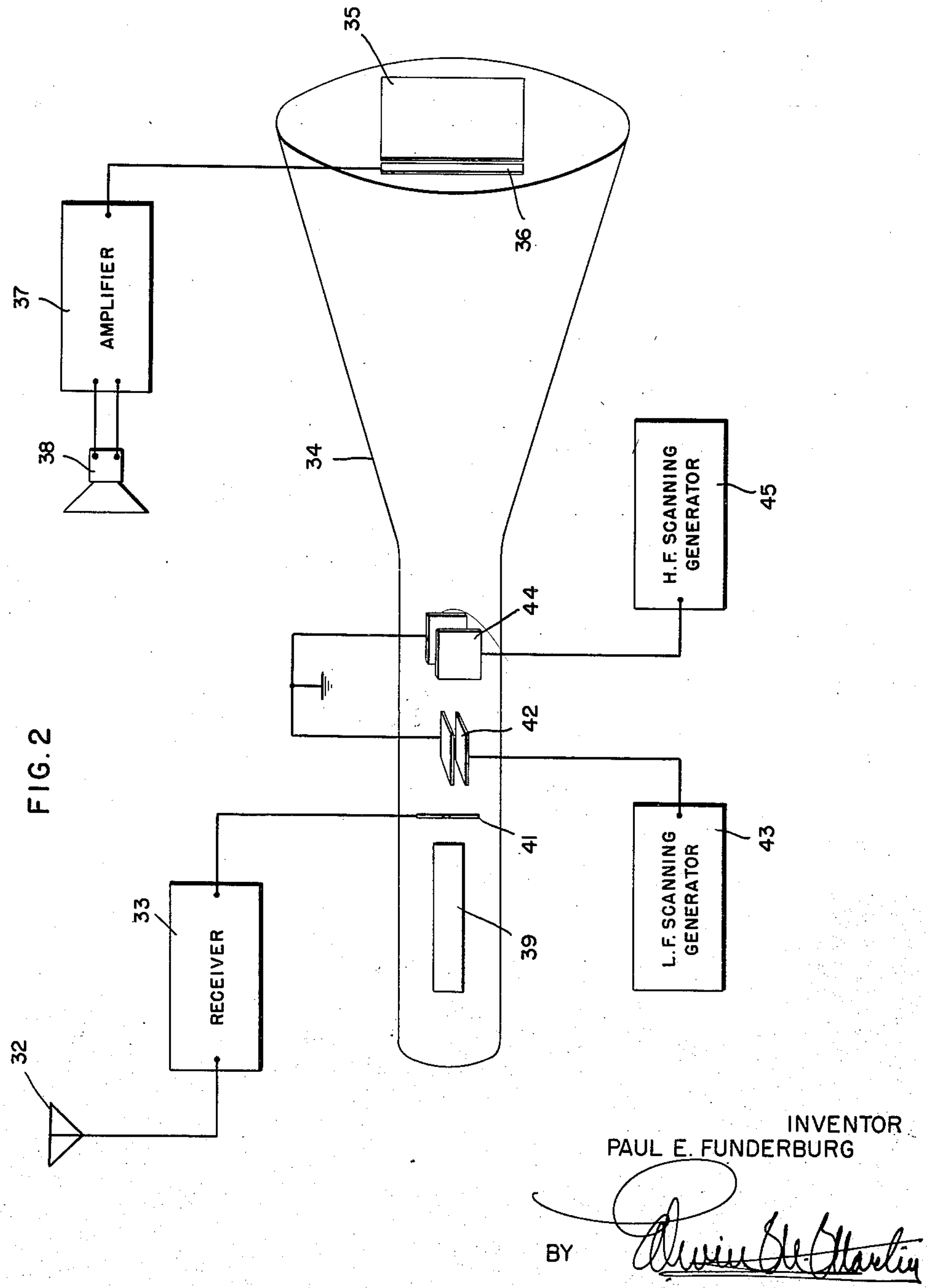

In the accompanying drawings:

Fig. 1 is a diagrammatic illustration of transmitting apparatus embodying the invention; and Fig. 2 is a diagrammatic illustration of receiving apparatus in accordance with the invention.

Having reference now to Fig. 1 of the drawings, there is indicated typical transmitting apparatus in accordance with this invention. This apparatus includes a signal generating tube represented as an iconoscope 11. It will be understood that this particular type of tube is merely illustrative for the purpose of describing a specific embodiment of the invention. Other types of signal generating tubes such as an orthicon or an image dissector may be employed with equal facility.

The iconoscope includes a photosensitive mosaic electrode 12. This electrode comprises the usual metallic signal plate having a dielectric layer on one face thereof and a plurality of discrete photosensitive particles disposed on the dielectric. For the purpose of the present invention the major portion 13 of the mosaic electrode is formed in the usual manner whereby leakage between the photosensitive particles and the signal plate is minimized. This portion of the electrode therefore is capable of developing a charge image of a television subject which will be retained at least for the interval between successive scansions of the different elemental areas of the mosaic. The electrode also is provided, along one vertical edge thereof, with a minor portion 14. By any suitable means such as the provision of relatively large leakage between the photosensitive particles and the signal plate, this portion of the electrode is made substantially instantaneously responsive to the light intensity impinging thereon. It, therefore, is incapable of developing a charge which will be retained for any appreciable length of time.

Light reflected from a television subject 15 is projected by a suitable optical system 16 upon the major portion 13 of the mosaic electrode in the usual manner. Also light from a suitable source 17 is formed into a beam by optical means such as a lens 18. This beam of light is passed through an intensity modulating device such as a light valve 19. The beam of light from the modulator is directed onto a mirror 21 by which it is reflected. The reflected light is projected by an optical system 22 onto the minor portion 14 of the mosaic electrode. The beam of light which is projected onto the vertical edge portion 14 of the mosaic electrode is spread in substantially uniform intensity over the entire area of the vertical strip. The intensity of this light beam is modulated by the valve 19 to represent the sound effects accompanying the television subject. For this purpose the light valve is connected to an electroacoustical device such as a microphone 23.

An electron beam generated in a conventional manner by an electron gun 24 is deflected over the mosaic electrode 12 in a predetermined scanning pattern. According to conventional methods of operating such a device, the electron beam is deflected vertically at a relatively low frequency by a deflecting system such as the plates 25. These deflecting plates are connected to a low frequency scanning generator 26 which produces a saw-tooth wave having the desired relatively low frequency. In like manner the electron beam is deflected horizontally over the mosaic electrode 12 by a deflecting system such as the plates 27. The horizontal deflecting plates are connected to a high frequency scanning generator 28 which produces a saw-tooth wave having the desired relatively high frequency.

The signal plate of the mosaic electrode 12, or other output circuit electrode of the tube, is connected to a transmitter 29 which preferably includes the usual amplifying and modulating apparatus, whereby to develop an amplitude modulated carrier frequency wave. Also, the transmitter includes the customary apparatus for injecting the necessary system control signals, such as synchronizing and blanking signals. This wave is impressed upon an antenna 31 by which it is radiated.

Having reference now to Fig. 2 of the drawings, the receiving apparatus in accordance with the present invention will be described. The carrier wave which is radiated by the transmitting antenna 31 of Fig. 1 is intercepted by a receiving antenna 32 which is coupled to the usual receiving circuits 33. This receiver includes the usual apparatus comprising radio frequency amplifiers, frequency converter, intermediate and other amplifiers together with signal separating circuits for segregating the intelligence signals from the system control signals.

The receiving apparatus also includes a cathode ray tube 34 which is provided with the usual fluorescent screen 35. It also is provided with an auxiliary electrode 36 which preferably is metallic and extends along one vertical side of the fluorescent screen. The electrode 36 is coupled to an amplifier 37 which preferably is provided with a low pass filter having a cut-off point at five or six kilocycles or higher. The output circuit of the amplifier is coupled to a sound reproducing device such as a loud speaker 38.

The cathode ray tube 34 also is provided with a conventional electron gun 39 by means of which to generate an electron beam. The intensity of this electron beam is modulated by a grid 41 in accordance with the received intelligence signals. For this purpose the grid is coupled to the receiver 33. A vertical deflecting system such as the plates 42 is energized by being connected to a low frequency scanning generator 43. This scanning generator develops a saw-tooth wave having the desired relatively low frequency to control the deflection of the electron beam vertically at a relatively slow rate over the fluorescent screen 35 and the auxiliary electrode 36. The tube also is provided with a horizontal deflecting system such as the plates 44 which are coupled to a high frequency scanning generator 45. The saw-tooth wave produced by the high frequency scanning generator at the desired relatively high frequency effects the deflection of the electron beam horizontally over the fluorescent screen 35 and the auxiliary electrode 36 at a relatively rapid rate.

Referring now to the operation of the described system embodying the invention, the light representing the television subject 15 is projected onto the major portion 13 of the mosaic electrode 12 to develop a charge image of the subject in a well-known manner. Simultaneously the sound which accompanies the television subject is impressed upon the microphone 23 whereby to so control the operation of the light valve 19 that the auxiliary beam of light projected onto the minor portion 14 of the mosaic electrode is modulated in intensity to represent the sound.

The electron beam which scans the mosaic electrode traverses both portions of the mosaic electrode from one vertical side to the other once for every horizontal line scanned. The signals generated by scanning the major portion of the mosaic electrode represent successive elemental areas of the television subject in accordance with the well-known operation of a signal generating tube of this type. However, a relatively small portion of each group of signals generated in one horizontal sweep of the scanning beam represents the light intensity of the minor portion 14 of the electrode. Inasmuch as this light intensity is representative of the sound, there will be produced in the output circuit of the tube, audio signals interspersed with the video signals. The light intensity representing the sound changes instantaneously with the character of the sound, and by reason of the described responsiveness of the minor electrode portion 14, the audio signals which are generated also vary in accordance with the sound.

At the receiver, the interspersed audio and video signals which are impressed upon the intensity control grid 41 of the tube 34 modulate the electron beam so that on each horizontal deflection thereof, while it is traversing the auxiliary electrode 36, the intensity of the beam is in accordance with the audio signals. During the remainder of each horizontal deflection of the beam the intensity varies according to the video signals and a light image is produced on the fluorescent screen in the usual manner. The electrode 36, in conjunction with the electron beam, acts as a signal amplifier much in the manner of a conventional vacuum tube.

The audio signals are impressed upon the electrode 36 in the form of pulses which are interrupted during the time that the beam is scanning the fluorescent screen. In systems wherein 525 line scansion is employed, these audio signal pulses occur at the rate of 15,750 per second. In other words, the repetition frequency of the audio pulses is 15.75 kilocycles. By providing the amplifier 37 with a filter network capable of passing signal energy only below five or six kilocycles, it is seen that all higher frequencies will be attenuated. Thus, only the sound modulation will be reproduced in the output circuit of the amplifier for controlling the sound reproducing device 38.

A dissector tube used in practicing the invention requires no substantial modification to accommodate both the picture and the accompanying sound. Such a device does not operate on a charge storage principle. The electron emission from the photosensitive electrode is in proportion at all times to the intensity of the light projected thereon.

A signaling system in accordance with the present invention has the advantage of requiring only one transmitter and one receiver for both the video and the audio signals. Furthermore, it has the additional advantage of employing signals of but one general type. For both the audio and video intelligence amplitude modulated signals are employed. Special apparatus therefore is not required for the transmission and/or reception of two different types of signals such as used in other systems where the video intelligence is in the form of amplitude modulated signals and the audio intelligence is in the form of frequency modulated signals. It appears to be obvious that the slight reduction in the size of the picture area, which would occur if conventional sized electrodes are employed, is compensated for in large measure by the economies which may be effected in the transmitting and receiving apparatus. Moreover, it requires but a relatively minor modification of conventional signal generating and reproducing tubes to maintain the size of the picture area as at present and to make the additional provisions in these tubes for the audio portions of the tube electrodes.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a signaling system, signal generating apparatus comprising, a cathode ray tube having a photosensitive charge storage mosaic electrode, the major portion of said electrode having a relatively long time charge storage capability and a minor portion located along one vertical edge thereof having a relatively short time charge storage capability, means including a first optical system for projecting a light image representative of a television subject onto the major portion of said electrode, means including a second optical system for projecting a light beam of uniform intensity onto substantially the entire area of the minor portion of said electrode, means including a light valve located in the path of said beam for modulating the intensity of said beam, an electroacoustical device coupled to said light valve and responsive to sounds accompanying said television subject for controlling the operation of said light valve whereby to effect the intensity modulation of said light beam in accordance with the accompanying sound, and means for deflecting an electron beam over said electrode according to a predetermined scanning pattern to generate video and audio signal effects representative respectively of the television subject and the accompanying sound.

2. In a signaling system, signal generating apparatus comprising, a cathode ray tube having a photosensitive charge storage electrode, a first portion of said electrode having a relatively long time charge storage capability and a second portion having a relatively short time charge storage capability, means for projecting a light image representative of a television subject onto said first portion of said electrode, means for projecting a light beam onto said second portion of said electrode, means located in the path of said beam for modulating the intensity of said beam in accordance with the accompanying sound, and scanning means operating in accordance with said electrode to generate electrical signal effects representative of both the television subject and the accompanying sound.

3. In a signaling system, signal generating apparatus comprising, a cathode ray tube having a photosensitive charge storage mosaic electrode, the major portion of said electrode having a relatively long time charge storage capability and a minor portion having a relatively short time charge storage capability, means for projecting a light image representative of a television subject onto the major portion of said electrode, means for projecting a light beam of uniform intensity onto the minor portion of said electrode, means located in the path of said beam for modulating the intensity of said beam, means coupled to said light modulating means and responsive to sounds accompanying said television subject to effect the intensity modulation of said light beam in accordance with the accompanying sound, and means for deflecting an electron beam over said electrode according to a predetermined scanning pattern to generate electrical signal effects representative of both the television subject and the accompanying sound.

4. In a cathode ray tube for use in television signal generating apparatus, a photosensitive charge storage mosaic electrode comprising, a charge storage portion having a relatively long time charge storage capability, and a second charge storage portion having a relatively short time charge storage capability.

5. In a cathode ray tube for use in television signal generating apparatus, a photosensitive charge storage mosaic electrode comprising, a major charge storage portion having a relatively long time charge storage capability, and a minor charge storage portion having a relatively short time charge storage capability.

6. In a cathode ray tube for use in television signal generating apparatus, a photosensitive charge storage mosaic electrode comprising, a major charge storage portion having a relatively long time charge storage capability, and a minor charge storage portion located along one vertical edge of said electrode and having a relatively short time charge storage capability.

PAUL E. FUNDERBURG.

REFERENCES CITED

The following references are of record in the file of this patent:

UNITED STATES PATENTS

| Number | Name | Date |
|---|---|---|
| Re. 22,025 | Wald | Feb. 10, 1942 |
| 2,098,598 | Schroter | Nov. 9, 1937 |
| 2,173,923 | Teal | Sept. 26, 1939 |
| 2,195,676 | McCarty | Apr. 2, 1940 |
| 2,257,562 | Branson | Sept. 30, 1941 |
| 2,289,921 | Massa | July 14, 1942 |
| 2,368,884 | Schade | Feb. 6, 1945 |
| 2,409,488 | Homrighous | Oct. 15, 1946 |